Patented Jan. 18, 1949

2,459,360

UNITED STATES PATENT OFFICE 2,459,360

LACTONE DERIVATIVES OF 2-PYRIDONE COMPOUNDS

William F. Bruce, Penfield, Pa., assignor to Wyeth Incorporated, Philadelphia, Pa., a corporation of Delaware No Drawing. Application April 3, 1945, Serial No. 586,439

3 Claims. (Cl. 260—295.5)

This invention is concerned with the preparation of lactone derivatives of pyridone-2, which compounds may be represented by the formula

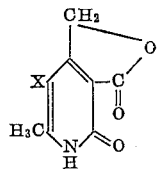

wherein X may be a hydroxyl group or a halogen such as bromine, chlorine or iodine convertible by treatment with water and alkali under pressure into a hydroxyl group.

Some of the pyridone compounds of my invention are useful in the treatment of anemic conditions, while some are useful as intermediates for the preparation of substances which increase the hemoglobin content of blood in anemic conditions.

The invention will be described more fully in conjunction with the following specific examples. It should be understood, however, that the examples are given by way of illustration only, and the invention is not to be limited by the details set forth therein.

EXAMPLE I

*Preparation of the lactone of 3-carboxy-4-hydroxymethyl-5-bromo-6-methyl-2-pyridone*

17 g. (0.1 mol) of the lactone of 3-carboxy-4-hydroxymethyl-6-methyl-2-pyridone was dissolved in 200 cc. of glacial acetic acid and the solution was heated to 70° C. Bromine was added to this solution until the color of the solution indicated an excess of bromine. The solution was poured into 300 cc. of cold water and treated with enough ammonium hydroxide to decolorize the product. The bromo compound precipitated and was filtered off and recrystallized from hot 50% alcohol. The yield of the lactone of 3-carboxy-4 - hydroxymethyl-5-bromo-6-methyl-2-pyridone amounted to 21 g. equal to about 84% of the theoretical yield. The product melted at 315° C. with decomposition, Analysis:
  Calculated for: $C_8H_6O_3NBr$, 39.37% C, 2.48% H
  Found: 39.52%, 2.71%

The bromo compound is soluble in alcohol, acetic acid, pyridine and other polar organic solvents.

EXAMPLE II

*Preparation of the lactone of 3-carboxy-4-hydroxymethyl-5-hydroxy-6-methyl-2-pyridone*

In an autoclave were put 30 g. of 6-methyl-5-bromo-4-hydroxymethyl-3-carboxy - 2 - pyridone lactone, together with 50 cc. of water and 10 g. of sodium carbonate. The autoclave was closed tight and heated at 210° C. for an hour, when a dark red color appeared. After cooling, the autoclave was opened and the dark solution filtered and acidified. Upon standing, a precipitate appeared which was filtered off and air dried. A Beilstein test showed the absence of halogen. The product was crystallized from a mixture of methanol and ethanol and melted with decomposition at 338° C. The yield of straw yellow colored lactone of 6-methyl-5-hydroxy-4-hydroxymethyl-3-carboxy-2-pyridone amounted to 15 g. Upon concentration of the mother liquor, 10 g. more of the product was obtained as the sodium salt.

Analysis for carbon and hydrogen agreed well with the formula for the lactone of 6-methyl-5-hydroxy-4-hydroxymethyl-3-carboxy-2-pyridine. The product was soluble in alcohol, acetic acid and alkalies.

The corresponding lactone of 3-carboxy-4-hydroxymethyl-5-iodo-6-methyl-2-pyridone can be prepared by a procedure similar to Example I from the lactone of 3-carboxy-4-hydroxymethyl-6-methyl-2-pyridone using a conventional iodination procedure. Likewise, the lactone of 3-carboxy-4-hydroxymethyl-5-chloro-6-methyl - 2-pyridone can be obtained by a conventional chlorination procedure from the lactone of 3-carboxy-4-hydroxymethyl-6-methyl-2-pyridone.

I claim:

1. The lactone of 3-carboxy-4-hydroxymethyl-5-hydroxy-6-methyl-2-pyridone.

2. The process for the production of the lactone of 3-carboxy - 4 - hydroxymethyl - 5 - hydroxy-6-methyl-2-pyridone, which comprises halogenating the lactone of 3-carboxy-4-hydroxymethyl-6-methyl-2-pyridone in the 5 position by treatment with a halogen other than fluorine, isolating the halogenated lactone, and replacing the substituent halogen by hydroxyl by hydrolysis in a mildly alkaline medium at an elevated temperature under superatmospheric pressure.

3. The process as defined in claim 2, in which the treatment is with bromine in glacial acetic acid solution.

WILLIAM F. BRUCE.

(References on following page)

REFERENCES CITED

The following references are of record in the file of this patent:

UNITED STATES PATENTS

| Number | Name | Date |
|---|---|---|
| 2,240,078 | Harris | July 8, 1941 |
| 2,266,754 | Harris | Dec. 23, 1941 |
| 2,325,053 | Harris | July 27, 1943 |
| 2,371,694 | Kuhn | Mar. 20, 1945 |

FOREIGN PATENTS

| Number | Country | Date |
|---|---|---|
| 122,536 | Switzerland | 1927 |

OTHER REFERENCES

Bruce et al.: J. Amer. Chem. Soc., December 1944.

Moir: Chem. Soc. J. 1902; vol. 81, part 1, pp. 100–108.

Certificate of Correction

Patent No. 2,459,360.  January 18, 1949.

WILLIAM F. BRUCE

It is hereby certified that error appears in the printed specification of the above numbered patent requiring correction as follows:

Column 3, line 8, list of references cited, for "2,240,078" read *2,248,078*;

and that the said Letters Patent should be read with this correction therein that the same may conform to the record of the case in the Patent Office.

Signed and sealed this 21st day of June, A. D. 1949.

[SEAL]

THOMAS F. MURPHY,
*Assistant Commissioner of Patents.*